June 19, 1928.                                                1,673,925
C. E. SWENSON
UNIVERSAL JOINT
Filed June 20, 1927

Inventor:
Carl E. Swenson
By Wilson & McCanna
Attys.

Patented June 19, 1928.

1,673,925

UNITED STATES PATENT OFFICE.

CARL E. SWENSON, OF ROCKFORD, ILLINOIS, ASSIGNOR OF ONE-FOURTH TO LEVIN FAUST, ONE-FOURTH TO ERIC S. EKSTROM, AND ONE-FOURTH TO CARL L. ANDERSON, OF ROCKFORD, ILLINOIS.

UNIVERSAL JOINT.

Application filed June 20, 1927. Serial No. 199,901.

This invention relates to universal joints of the trunnion type adapted primarily for use in motor vehicles.

One object is to improve the construction of universal joints of this type and to provide for oil lubrication of the trunnion bearings. My invention provides improved means for retaining a supply of oil for lubrication of the trunnion bearings over a long period of service. By so retaining the oil and preventing access of dust, dirt, and other foreign matter to the bearings and the lubricant container, the life of the joint is greatly increased and the joint will function efficiently over a long period without attention.

While my invention is applicable in general to trunnion type universal joints I have for purpose of illustration shown it as embodied in a universal joint of the kind disclosed in Reissue Patent No. 15,980, dated Jan. 13, 1925.

Other objects and attendant advantages will be appreciated by those skilled in this art as the invention becomes better understood by reference to the following description when considered in connection with the accompanying drawings, in which—

Figure 1:
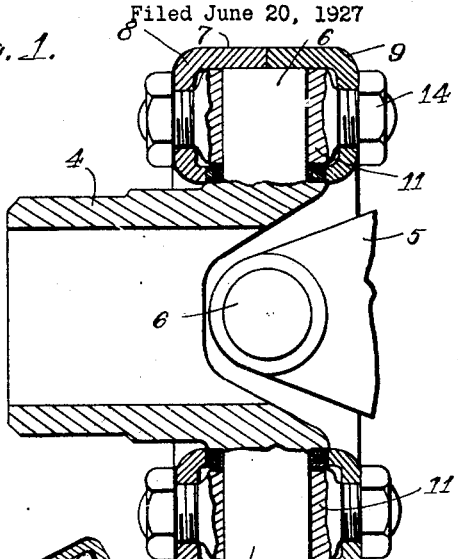
Figure 1 is a longitudinal section through a universal joint embodying my invention.
Figure 2:
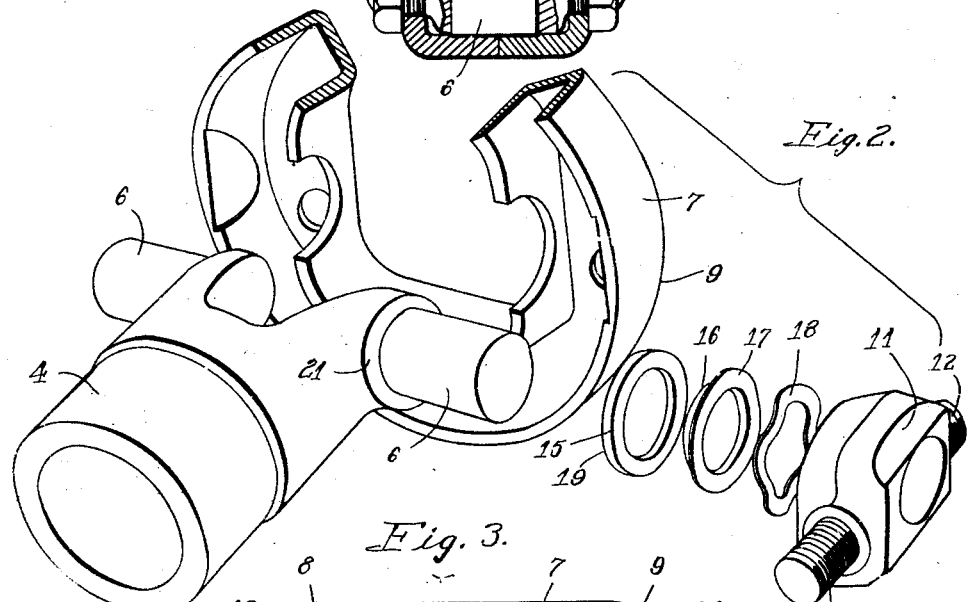
Fig. 2 is a fragmentary perspective view showing certain of the parts disassembled; and, Fig. 3 is an enlarged section through one of the trunnion joints.
Figure 3:
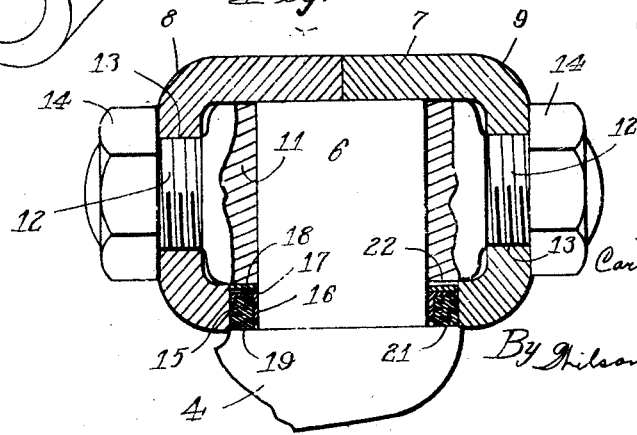

The universal joint to which I have applied my improvement in this particular instance is substantially as shown in the reissue patent above mentioned.

The yokes 4 and 5 having trunnions 6 are of conventional type. The trunnions are connected by a ring housing structure designated generally by 7 which also serves as a container or reservoir for the oil. According to this particular design the housing structure is made up of stampings 8 and 9, U-shape in cross-section, clamped together by means which serve also to provide trunnion bearings. Said means comprise a bearing block 11 for each trunnion having threaded ends 12 which project through openings 13 in the side walls of the housing sections and are equipped with nuts 14 which when tightened clamp the housing sections together and also secure the bearing blocks in position. The purpose of the foregoing construction is to provide a suitable power transmitting connection between the trunnions whereby angularity of movement is allowed between the yokes 4 and 5, also to provide proper bearings for the trunnions and means for lubricating these bearings over a long period.

For reasons well known in this art it is desired to use oil as a lubricant. This presents problems which have been difficult of solution especially in view of the conditions and requirements in the automotive industry for which universal joints of this kind are produced in large numbers.

According to the present invention I mount a packing washer 15 on a metal ring or ferrule 16 in turn mounted with a sliding fit on each trunnion at the inner end or base thereof. This ferrule has an outwardly turned flange 17 against which a spring washer 18 acts for urging the face 19 of the washer 15 against a shoulder 21 at the base of the trunnion. The washer 15 is of suitable resilient packing material such for example as a cork composition. The packing washer is of such diameter that it will be held under compression when the housing sections 8 and 9 are clamped together. The ferrule 16 serves to reinforce and strengthen the washer so that it will retain its shape. The ferrule has another function in that its provides a metal bearing against the trunnion the coefficient of friction of which is less than that between the packing and the housing with the result that friction between the packing and trunnion is reduced and there is little or no tendency for the packing to turn in the housing. Another important function of the ferrule is that its flanged end 17 provides a thrust face for the spring 18. This spring may be in the form of a crimped washer as shown of spring steel properly heat treated and hardened so that it will permit flattening without fracture. The spring washer in this instance is interposed between a shoulder 22 on the bearing block 11 and the flange 17 of the ferrule so as to urge the packing washer axially against the shoulder 21.

The packing above described maintains an oil tight joint between the housing structure and each trunnion. With this construction the packing is continually under compression and the joints through which leakage might otherwise occur are continually sealed. Furthermore each packing is positively held under compression by the clamping effect of the housing sections 8 and 9 so that it will not turn in the housing; consequently friction and wear occurs only at the end face 19 which bears against the shoulder 21 of the trunnion. This wear is continually taken up by the spring 18. A packing of this kind will prevent leakage of the oil under the high internal pressures that are sometimes present or developed during service and, obviously, will exclude dust, dirt and foreign matter. Another advantage of the ferrule construction is that the packing washer is reinforced and given greater life and wearing qualities. As a result of this long maintenance of the oil supply the efficiency and life of a universal joint is increased. Another important advantage to the user, especially in the application to motor vehicles, is that the lubricant will be retained over a remarkably long period, thus reducing service requirements to a minimum.

It should be expressly understood that my invention is not limited to the particular design or construction of the universal joint shown herein merely for purpose of illustration, but is applicable to any trunnion type universal joint; furthermore in its adaptation to different joints changes may be made in details of construction without departing from the spirit and scope of the invention as expressed in the appended claims, in which—

I claim:

1. In a universal joint having trunnions and enclosed bearings adapted to be lubricated, means for sealing each bearing against loss of lubricant comprising a packer washer, a ferrule providig a bearing for said washer on the trunnion, and a spring for urging the packing washer axially against a seat to maintain an oil tight joint.

2. In a universal joint, in combination, trunnions each having a shoulder at its inner end, a bearing member for each trunnion having a shoulder opposed to the first mentioned shoulder, and packing means interposed between said shoulders comprising a ferrule on the trunnion having a flange at its end adjacent to the bearing member, a packing on said ferrule seated against said trunnion shoulder, and a spring interposed between said bearing shoulder and said flange for urging the packing against said trunnion shoulder.

3. In a universal joint, in combination, yokes having trunnions, a housing for connecting the trunnions, a bearing member in the housing for each trunnion, the housing being adapted to carry oil for lubricating the trunnion bearings, and a packing between the housing and each trunnion comprising a ferrule on the trunnion, a packing washer on the ferrule seating at one end against a shoulder on the trunnion and at its periphery against the housing, and a spring interposed between the ferrule and the bearing member for urging the packing washer against said shoulder.

4. In a universal joint having enclosed lubricated trunnions, a packing for the joint between the enclosing structure and a shoulder at the base of each trunnion comprising a washer of cork composition adapted to seat against said shoulder, a ferrule providing a bearing for the washer on the trunnion, and a spring acting against the ferrule for urging the washer against said shoulder and maintaining an oil tight joint.

5. In a universal joint having trunnions, a housing structure connecting the trunnions and providing an oil reservoir, and packing means for the joint between said housing structure and each trunnion comprising a ferrule on the trunnion, a packing washer on the ferrule peripherally clamped by the housing structure, and a spring washer acting against the ferrule for urging the packing washer axially to prevent leakage of oil through said joint.

6. In a universal joint, in combination, a pair of yokes having trunnions, a ring type housing adapted to connect the trunnions and providing a lubricant container, a bearing member in the housing for each trunnion, said parts being constructed to provide an annular space at the inner end of each trunnion for the reception of a packing, and a packing in each such space comprising a packing washer, a metal ring seated against the packing washer, and a spring washer acting against said metal ring for urging the packing washer axially against its seat to maintain an oil tight joint.

7. A universal joint of the trunnion type having enclosed bearings for the trunnions and means providing for oil lubrication of said bearings, and means for sealing each bearing against loss of lubricant comprising a packing washer for each trunnion seating against a shoulder at the base of the trunnion and held under compression, a ferrule on the inner periphery of each packing washer bearing on the trunnion and having an outwardly turned flange intermediate the packing ring and the adjacent trunnion bearing.

In witness of the foregoing I affix my signature.

CARL E. SWENSON.